US009959473B2

United States Patent
Koide et al.

(10) Patent No.: US 9,959,473 B2
(45) Date of Patent: May 1, 2018

(54) SYMBOL RECOGNITION DEVICE AND TRAFFIC SIGN RECOGNITION DEVICE

(71) Applicant: HIROSHIMA UNIVERSITY, Higashi-Hiroshima-shi, Hiroshima (JP)

(72) Inventors: Tetsushi Koide, Hiroshima (JP); Hoang Anh Tuan, Hiroshima (JP); Masaharu Yamamoto, Hiroshima (JP); Tsubasa Mishima, Hiroshima (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 74 days.

(21) Appl. No.: 15/084,457

(22) Filed: Mar. 29, 2016

(65) Prior Publication Data

US 2016/0210520 A1 Jul. 21, 2016

Related U.S. Application Data

(60) Provisional application No. PCT/JP2014/004918, filed on Sep. 25, 2014.

(30) Foreign Application Priority Data

Sep. 30, 2013 (JP) ................................. 2013-203715
Oct. 17, 2013 (JP) ................................. 2013-216403

(51) Int. Cl.
*G06K 9/00* (2006.01)
*G06K 9/46* (2006.01)
*G06K 9/52* (2006.01)

(52) U.S. Cl.
CPC ....... *G06K 9/00818* (2013.01); *G06K 9/4642* (2013.01); *G06K 9/4647* (2013.01);
(Continued)

(58) Field of Classification Search
CPC combination set(s) only.
See application file for complete search history.

(56) References Cited

U.S. PATENT DOCUMENTS 4,288,779 A * 9/1981 Otsu ........................ G06K 9/80
382/170
5,056,154 A * 10/1991 Aono ...................... G06T 9/005
358/1.9

(Continued)

FOREIGN PATENT DOCUMENTS

JP 04-350783 A 12/1992
JP 06-52358 A 2/1994
(Continued)

OTHER PUBLICATIONS

Frank Y. Shih, "Image Processing and Pattern Recognition—Fundamentals and Techniques-", John Wiley & Sons, Inc., 2010, pp. 233-253.

(Continued)

*Primary Examiner* — Tsung-Yin Tsai
(74) *Attorney, Agent, or Firm* — Maschoff Brennan

(57) ABSTRACT

In a symbol recognition device, each histogram computation module receives an image of each partial region of a recognition target region in a binarized image and computes a frequency distribution of pixels of a given color in each line or column in the partial region; each run length determination module receives an image of each partial region of the recognition target region and determines whether or not a line or column of pixels of the given color having a certain length is present in the partial region; a control module feeds pixel information of the partial regions, read by scanning the binarized image stored in the image memory, into the histogram computation modules and the run length determination modules; a determination module determines a symbol included in the binarized image based on computa-
(Continued)

tion results of the histogram computation modules and determination results of the run length determination modules.

8 Claims, 13 Drawing Sheets

(52) U.S. Cl.
CPC ............ *G06K 9/4652* (2013.01); *G06K 9/52* (2013.01); *G06K 2009/4666* (2013.01); *G06K 2209/01* (2013.01); *G06T 2207/20021* (2013.01)

(56) References Cited

U.S. PATENT DOCUMENTS

| | | | | |
|---|---|---|---|---|
| 5,179,599 A | * | 1/1993 | Formanek | G06K 9/38 382/172 |
| 5,872,864 A | * | 2/1999 | Imade | G06K 9/00456 382/156 |
| 6,088,478 A | * | 7/2000 | Davies | G06T 9/005 382/168 |
| 6,141,444 A | * | 10/2000 | Hasegawa | G06K 9/346 358/453 |
| 7,065,261 B1 | * | 6/2006 | Horie | G06K 9/3283 348/E5.055 |
| 2003/0086615 A1 | * | 5/2003 | Dance | G06K 9/00456 382/200 |
| 2006/0140487 A1 | * | 6/2006 | Tabata | H04N 1/642 382/232 |
| 2016/0063323 A1 | * | 3/2016 | Isupov | G06K 9/00476 382/200 |

FOREIGN PATENT DOCUMENTS

| | | |
|---|---|---|
| JP | 07-287758 A | 10/1995 |
| JP | 2006-235752 A | 9/2006 |
| JP | 2008-286566 A | 11/2008 |

OTHER PUBLICATIONS

International Search Report and Written Opinion dated Dec. 16, 2014 in application No. PCT/JP2014/004918.

* cited by examiner

RECOGNITION TARGET REGION

FIG. 14
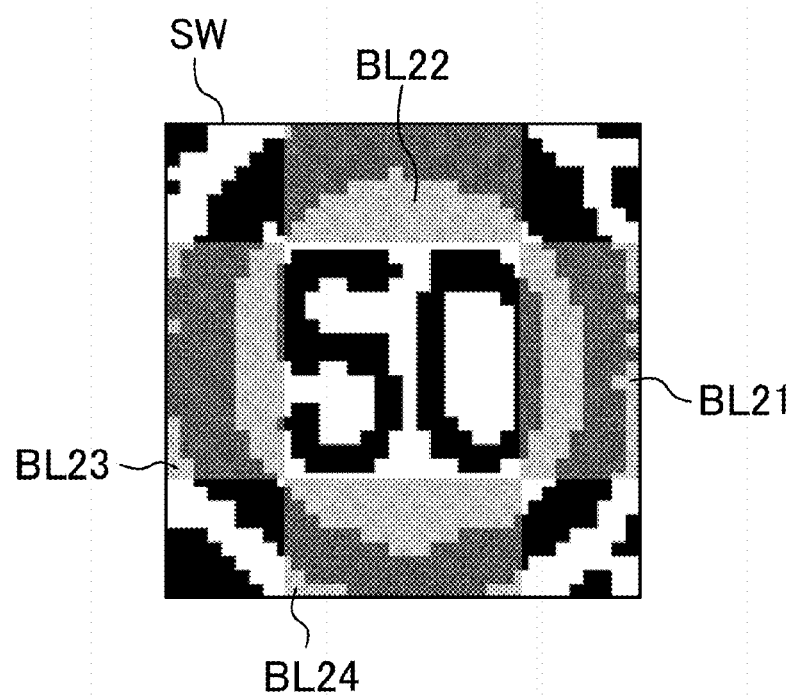
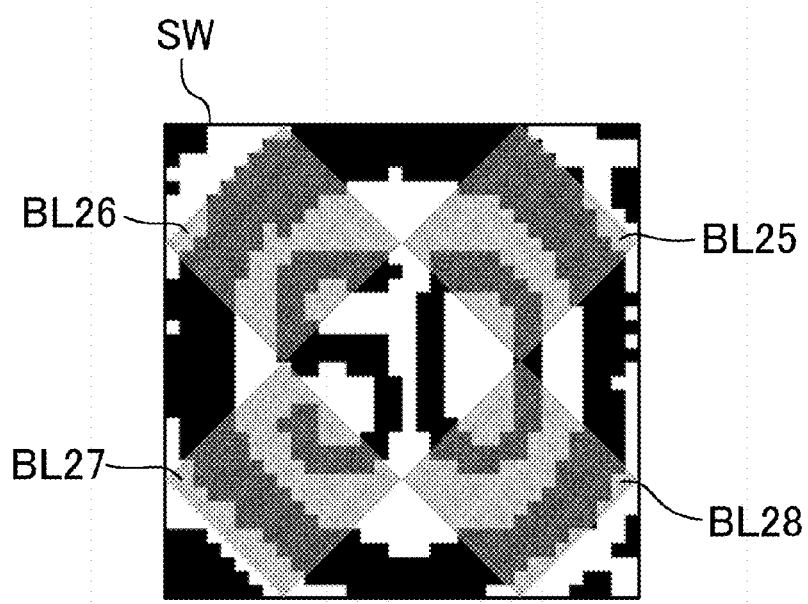

FIG. 15
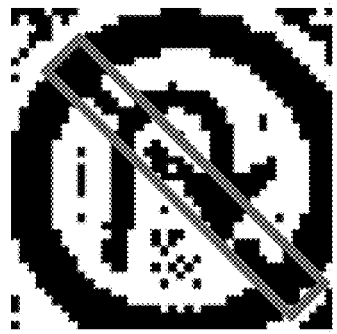
NO U-TURN
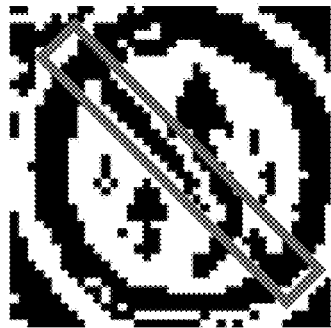
NO PASSING
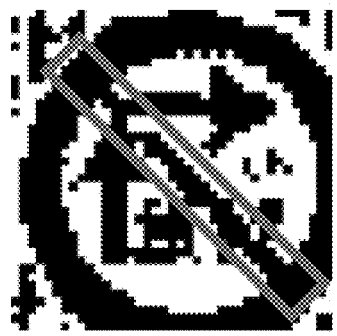
NO TWO-STAGE RIGHT TURN
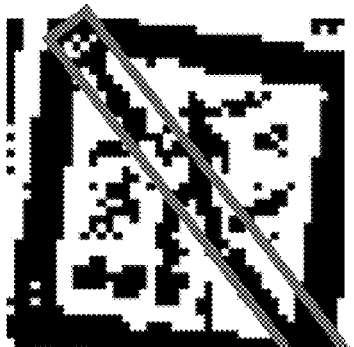
NO CROSSING
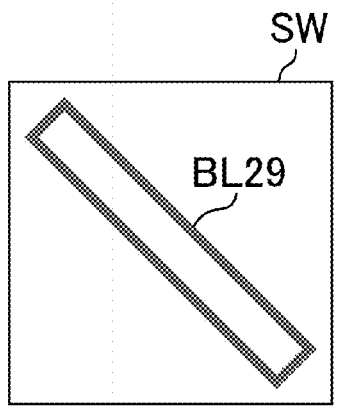
SW
BL29

SYMBOL RECOGNITION DEVICE AND TRAFFIC SIGN RECOGNITION DEVICE

CROSS-REFERENCE TO RELATED APPLICATIONS

This is a continuation of International Application No. PCT/JP2014/004918 filed on Sep. 25, 2014, which claims priority to Japanese Patent Applications No. 2013-203715 filed on Sep. 30, 2013 and No. 2013-216403 filed on Oct. 17, 2013. The entire disclosures of these applications are incorporated by reference herein.

BACKGROUND

The present disclosure relates to a device that recognizes symbols in images, and more particularly to a symbol recognition device suitable for recognition of numerals included in road speed signs. The present disclosure also relates to a traffic sign recognition device provided with a symbol recognition device.

In recent years, due to the increased number of widely used automobiles, the increase in the number of traffic accidents has become serious. Main causes of traffic accidents are responsibility of drivers such as delays in finding events, judgment errors, operation errors, etc. In order to prevent traffic accidents before they occur, judgment may be made by automobiles, to assist operations of the drivers, so that operation errors and judgment errors by the drivers can be prevented. To permit such judgment by an automobile, it is necessary to perform white road line recognition, pedestrian recognition, vehicle recognition, road sign recognition, etc. in real-time while the automobile is moving.

The road sign recognition includes detection of road speed signs and recognition of numerals. Conventionally, images are subjected to thinning processing and then pattern matching to recognize symbols such as letters, numerals, and marks (see FRANK Y. SHIH, "IMAGE PROCESSING AND PATTERN RECOGNITION—Fundamentals and Techniques—," John Wiley & Sons, Inc., 2010, pp. 233-253, for example).

The image thinning processing is a technique for software, which requires repetitively accessing an image from an image memory. Therefore, it is difficult to apply this technique in hardware implementation such as an automotive embedded system to perform real-time processing while the automobile is moving.

SUMMARY

A symbol recognition device according to an aspect of the disclosure includes: an image memory that stores a binarized image as a recognition target; a plurality of histogram computation modules each of which receives an image of each partial region of a recognition target region in the binarized image and computes a frequency distribution of pixels of a given color in each line or column in the partial region; a plurality of run length determination modules each of which receives an image of each partial region of the recognition target region and determines whether or not a line or column of pixels of the given color having a length equal to or greater than a given length is present in the partial region; a control module that feeds pixel information of the partial regions, read by scanning the binarized image stored in the image memory, into the plurality of histogram computation modules and the plurality of run length determination modules; and a determination module that determines a symbol included in the binarized image based on computation results of the plurality of histogram computation modules and determination results of the plurality of run length determination modules.

With the configuration described above, the binarized image stored in the image memory is read by the control module, and images of arbitrary partial regions of the binarized image are input into the histogram computation modules and the run length determination modules. Given processing is performed for the partial regions by the histogram computation modules and the run length determination modules independently from each other and concurrently, and the symbol included in the binarized image is determined by the determination module based on the output results of the histogram computation modules and the run length determination modules. In this way, the symbol included in the binarized image can be recognized with only one-time scanning of the binarized image by the control module.

BRIEF DESCRIPTION OF THE DRAWINGS

The figures depict one or more implementations in accord with the present teachings, by way of example only, not by way of limitations. In the figures, the same reference numbers refer to the same or similar elements.

FIG. 14 includes views showing example of partial regions of a binarized image processed by a candidate surrounding frame detection module.

FIG. 15 includes views showing an example of a partial region of a binarized image processed by an oblique line determination module and some examples of signs representing prohibition.

DETAILED DESCRIPTION

Embodiments are described in detail below with reference to the attached drawings. However, unnecessarily detailed description may be omitted. For example, detailed description of well known techniques or description of substantially the same elements may be omitted. Such omission is intended to prevent the following description from being unnecessarily redundant and to help those skilled in the art easily understand it.

The inventors provide the following description and the attached drawings to enable those skilled in the art to fully understand the present disclosure. Thus, the description and the drawings are not intended to limit the scope of the subject matter defined in the claims.

First Embodiment

Figure 1:
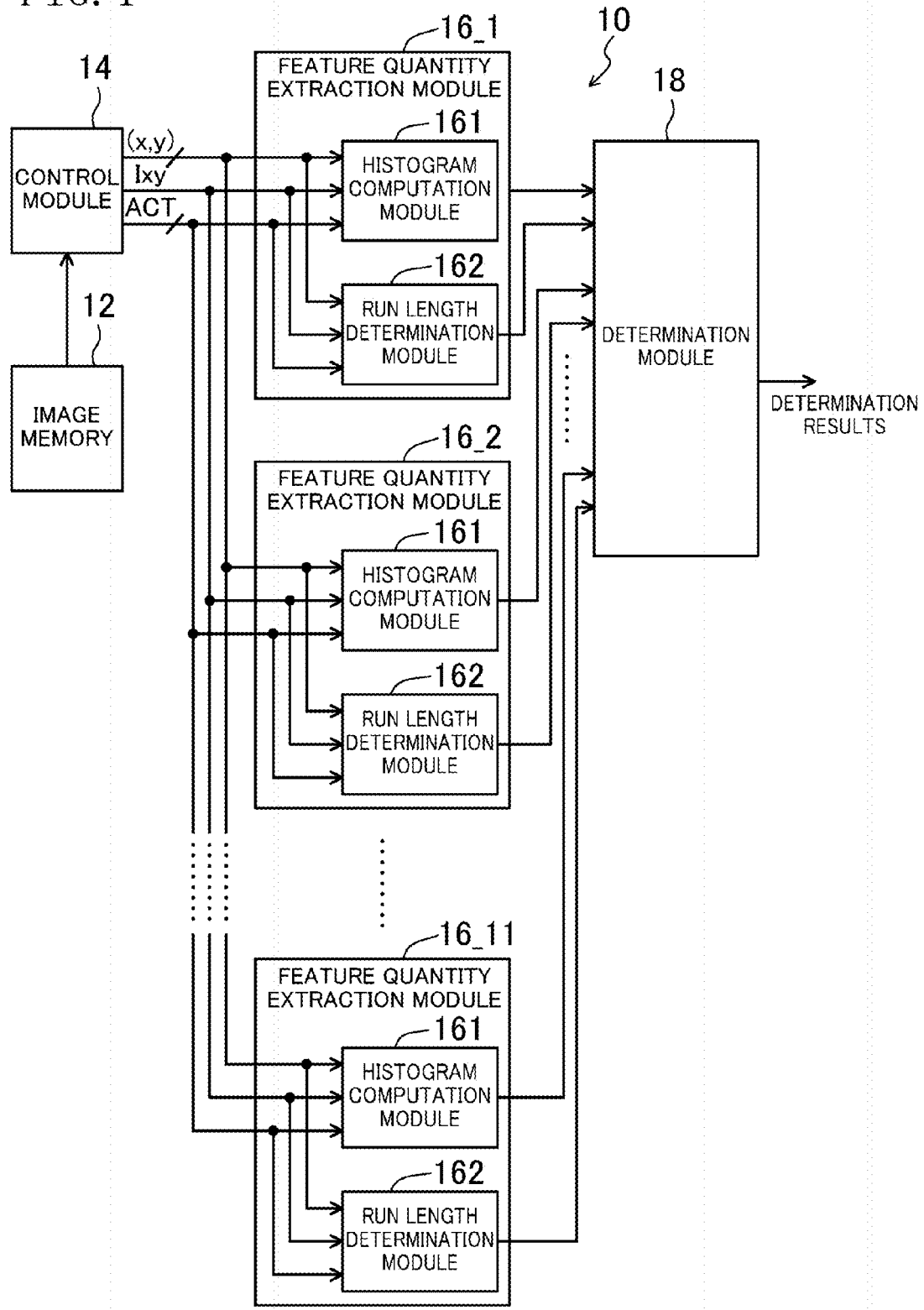
FIG. 1 is a block diagram of a main part of a symbol recognition device according to the first embodiment.

FIG. 1 shows a configuration of a main part of a symbol recognition device according to the first embodiment. A symbol recognition device 10 according to this embodiment is a device that recognizes a symbol included in a binarized image of a given size and, in particular, is suitable for recognition of a numeral included in a road speed sign.

The symbol recognition device 10 includes an image memory 12, a control module 14, eleven feature quantity extraction modules 16_1 to 16_11, and a determination module 18. Each of the feature quantity extraction modules 16_1 to 16_11 includes a histogram computation module 161 and a run length determination module 162. It is to be noted that, although illustration of the feature quantity extraction modules 16_3 to 16_10 is omitted in FIG. 1 for convenience, such feature quantity extraction modules 16_3 to 16_10 which are not shown here may be referred to in some cases in the following description.

The image memory 12 is a memory that stores a binarized image as a recognition target of the symbol recognition device 10. The image memory 12 can be constructed from a volatile memory such as a static random access memory (SRAM) and/or a dynamic random access memory (DRAM).

Figure 2:
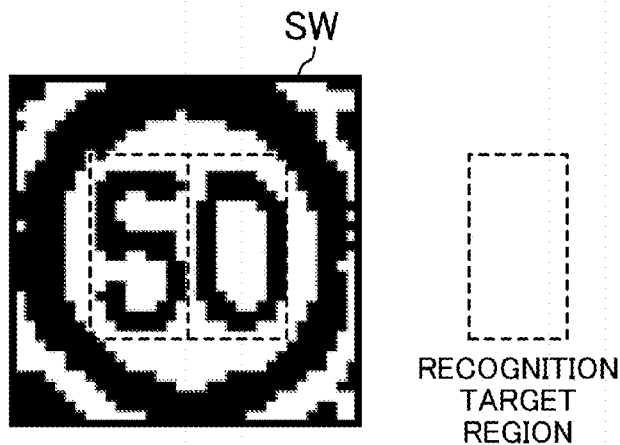
FIG. 2 is a view showing an example of a binarized image as a recognition target.

FIG. 2 shows an example of the binarized image as the recognition target. The image is obtained by binarizing an 8-bit gray-scale original image of 640×480 pixels shot with a camera mounted on an automobile that shoots a forward area and extracting a candidate region (hereinafter, referred to as a "scan window") of a road speed sign. The size of the scan window SW is about 20×20 pixels to 50×50 pixels.

As shown in FIG. 2, the road speed sign is represented by a design of a 2-digit numeral surrounded by a circle frame. The symbol recognition device 10 recognizes the digit in the ones place and the digit in the tens place included in the binarized image separately. That is, the symbol recognition device 10 recognizes the numeral included in each of two rectangular regions (surrounded by the broken lines in FIG. 2, which are hereinafter referred to as "recognition target regions") in roughly the center of the scan window SW. Note that the technology of binarizing a gray-scale original image and extracting a scan window is described in detail in Japanese Unexamined Patent Publication No. 2014-127162 by the present inventors.

Returning back to FIG. 1, the control module 14 feeds pixel information of partial regions, i.e., pixel values Ixy={0, 1} and coordinate data (x, y) representing the coordinates of the pixels, read by scanning the binarized image stored in the image memory 12, into the histogram computation modules 161 and the run length determination modules 162 of the feature quantity extraction modules 16_1 to 16_11. The readout of the pixel information can be made by word as a bunch of several pixels or by the pixel. More specifically, a coordinate range in the scan window is set for each partial region. While scanning the binarized image stored in the image memory 12, the control module 14 detects that coordinate data (x, y) has entered a coordinate range for a partial region, and outputs a control signal ACT to the histogram computation module 161 and the run length determination module 162 of one of the feature quantity extraction modules 16_1 to 16_11 corresponding to the partial region. For example, the histogram computation modules 161 and the run length determination module 162 take in the pixel values Ixy and the coordinate data (x, y) when the input control signal ACT is high and do not take in the pixel values Ixy or the coordinate data (x, y) when the control signal ACT is low. In this way, with only one-time scanning of the binarized image stored in the image memory 12, images of arbitrary partial regions of the binarized image can be input into the histogram computation modules 161 and the run length determination modules 162. Then, the histogram computation modules 161 and the run length determination modules 162 perform given processing for the input images independently from each other and concurrently.

In place of directly reading the image values Ixy from the image memory, the control module 14 may output a control signal for pixel value readout to the image memory 12, so that the image values Ixy read from the image memory 12 according to the control signal may be directly fed to the feature quantity extraction modules 16_1 to 16_11.

Figure 3:
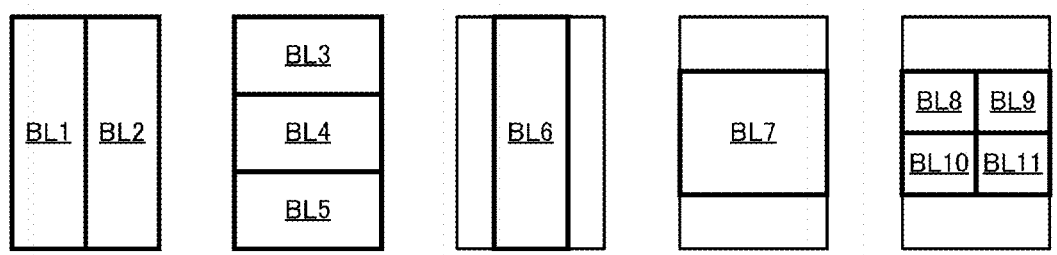
FIG. 3 includes views showing examples of partial regions of a recognition target region processed by feature quantity extraction modules.

FIG. 3 shows examples of partial regions of the recognition target region to be processed by the feature quantity extraction modules 16_1 to 16_11. Images of partial regions BL1 and BL2 obtained by vertically splitting the recognition target region into two, e.g., into two equal parts are input into the feature quantity extraction modules 16_1 and 16_2, respectively, and processed. Images of partial regions BL3, BL4, and BL5 obtained by horizontally splitting the recognition target region into three, e.g., into three equal parts are input into the feature quantity extraction modules 16_3, 16_4, and 16_5, respectively, and processed. An image of a partial region BL6 horizontally in the center of the recognition target region is input into the feature quantity extraction module 16_6. An image of a partial region BL7 vertically in the center of the recognition target region is input into the feature quantity extraction module 16_7. Images of partial regions BL8, BL9, BL10, and BL11 obtained by vertically and horizontally splitting a partial region vertically in the center of the recognition target region into four, e.g., into four equal parts are input into the feature quantity extraction modules 16_8, 16_9, 16_10, and 16_11, respectively, and processed.

Referring back to FIG. 1, the histogram computation modules 161, receiving images of their corresponding partial regions of the recognition target region, compute the frequency distribution of pixels of a given color in each line or column in the partial regions. Since numerals are displayed in black on a white background in the case of binarized images of normal road speed signs, the histogram computation modules 161 compute the frequency distributions of black pixels. In the case of binarized images of electrically displayed road speed signs, however, numerals are sometimes displayed in white on a black background. In this case, the histogram computation modules 161 compute the frequency distributions of white pixels.

Since the computation of histograms can be performed with addition operation and comparison operation, the histogram computation modules 161 can be basically constructed using adder circuits and comparators.

Figure 4:
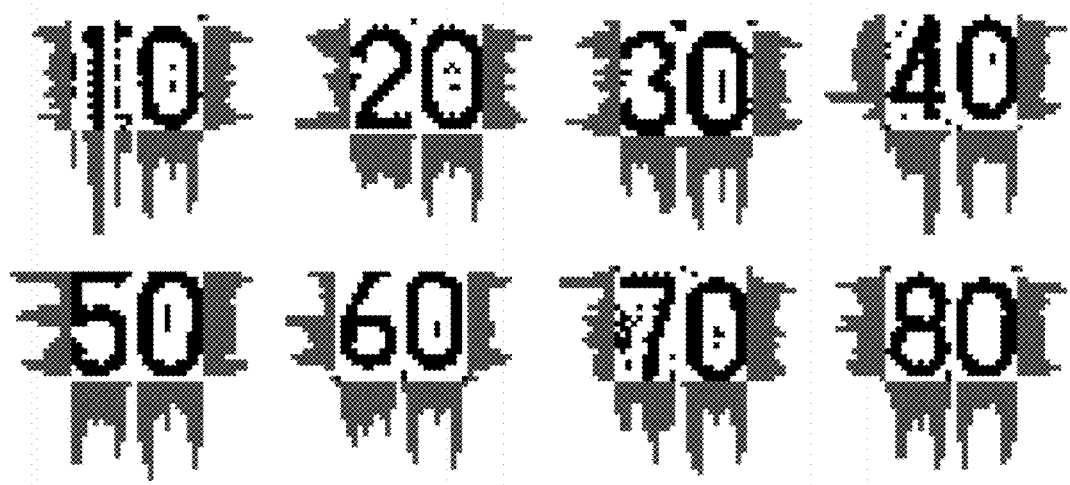
FIG. 4 includes views showing features of histograms of images of numerals "0" to "8."

FIG. 4 shows features of the histograms of images of numerals "0" to "8." In FIG. 4, the frequency distributions of black pixels in the lines in the recognition target region are shown on the sides of the numerals (on the right side for numeral "0" and on the left side for the other numerals), and the frequency distributions of black pixels in the columns in the recognition target region are shown under the numerals. As shown in FIG. 4, the histograms have different features for different numerals.

Figure 5A:
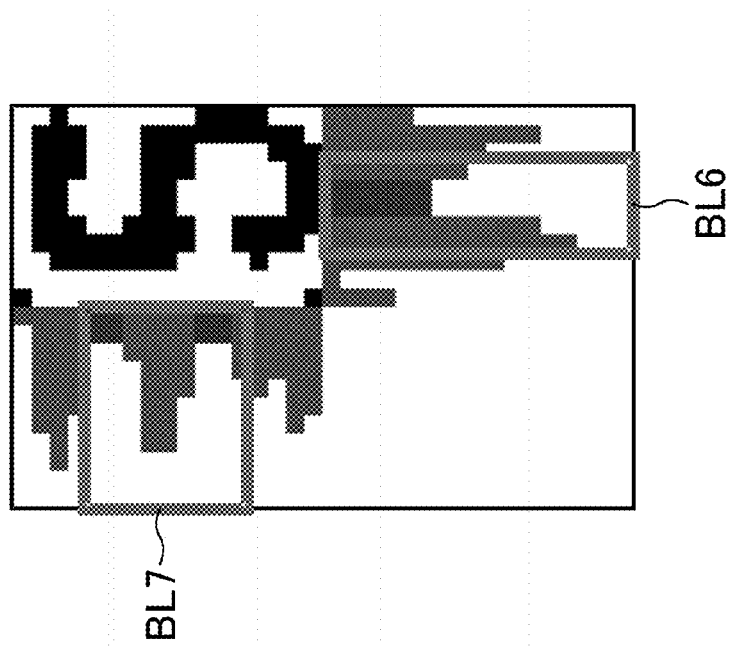
FIGS. 5A and 5B are views showing correspondences between histograms of an image of numeral "5" and partial regions.
Figure 5B:
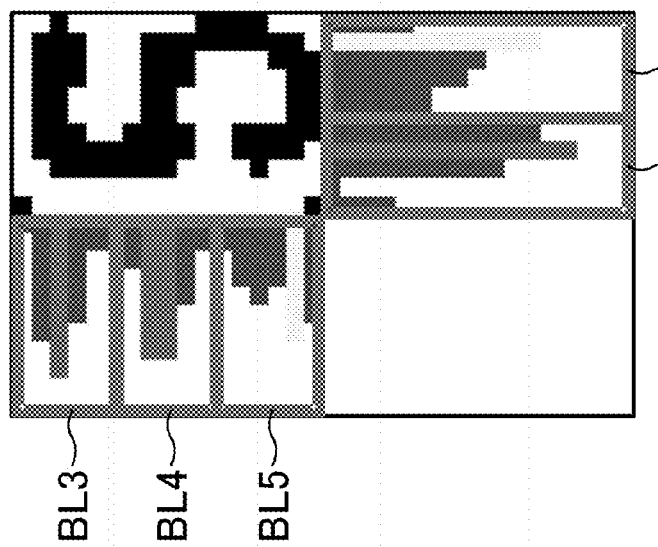

FIGS. 5A and 5B show the correspondences between the histograms of the image of numeral "5" and the partial regions BL1 to BL7. As shown in FIG. 5A, the histogram computation modules 161 of the feature quantity extraction modules 16_1 and 16_2 output the maximum values of the histograms corresponding to the partial regions BL1 and BL2, respectively, in the histogram in the column direction (i.e., the longitudinal direction) of the image of the numeral. The histogram computation modules 161 of the feature quantity extraction modules 16_3 to 16_5 output the maximum values of the histograms corresponding to the partial regions BL3 to BL5, respectively, in the histogram in the line direction (i.e., the lateral direction) of the image of the numeral. By contrast, as shown in FIG. 5B, the histogram computation module 161 of the feature quantity extraction module 16_6 outputs the minimum value of the histogram corresponding to the partial region BL6, in the histogram in the column direction of the image of the numeral. The histogram computation module 161 of the feature quantity extraction module 16_7 outputs the minimum value of the histogram corresponding to the partial region BL7, in the histogram in the line direction of the image of the numeral. Note that the maximum and minimum values of the histograms can each be defined as the percentage of the frequency of pixels of a given color included in each line or column with respect to the width or height of the recognition target region. The given color is black for the normal road speed signs, and white for the electrically displayed road speed signs, for example. When the symbol to be recognized is one other than any numeral included in road speed signs, the given color may be white or black as appropriate. Note that, from the nature of the binarized images, the maximum value of the histogram of black pixels corresponds to the minimum value of the histogram of white pixels, and the maximum value of the histogram of white pixels corresponds to the minimum value of the histogram of black pixels.

As described above, the maximum values of the histograms in the partial regions BL1 to BL5 and the minimum values of the histograms in the partial regions BL6 to BL7 have different features for different numerals, and are not easily affected by inclination of the numeral, displacement, superimposition of noise, etc. Therefore, the maximum and minimum values of the histograms of the partial regions can serve as effective feature quantities for recognition of a symbol present in the recognition target region.

Returning back to FIG. 1, the run length determination modules 162 receive images of the partial regions of the recognition target region, and determine whether or not a line or column of pixels of a given color having a length equal to or greater than a given length is present in the corresponding partial regions. As will be described later, an image of a numeral is characterized in the continuity of pixels of a given color in the line direction in portions of the image (recognition target region) other than the line segments representing the numeral. Therefore, the run length determination modules 162 determine the continuity of pixels of a given color in the line direction. Also, from the nature of font designs of numerals used in road speed signs, it is appropriate to designate the partial regions BL8 to BL11 as the target regions for the determination of the continuity of pixels of a given color. Accordingly, the run length determination modules 162 of the feature quantity extraction modules 16_8 to 16_11 respectively determine whether or not a white or black line having a length equal to or greater than a given length is present in the partial regions BL8 to BL11. The given length is an arbitrary length such as 90% or 95% of the width of the partial regions BL8 to BL11, for example. The width of the partial regions BL8 to BL11 may be designated as the given length. In this case, the run length determination modules 162 are to determine whether or not a totally white or black line is present in the partial regions BL8 to BL11. For binarized images of the normal road speed signs, since the numerals are displayed in black on a white background, the run length determination modules 162 determine the continuity of white pixels. By contrast, for binarized images of the electrically displayed road speed signs, numerals are sometimes presented in white on a black background. In this case, the run length determination modules 162 determine the continuity of black pixels.

Note that, since the run length can be processed with AND operation, OR operation, and addition, the run length determination modules 162 can be constructed as a combination circuit having an AND circuit, an OR circuit, and an adder.

Figure 6:
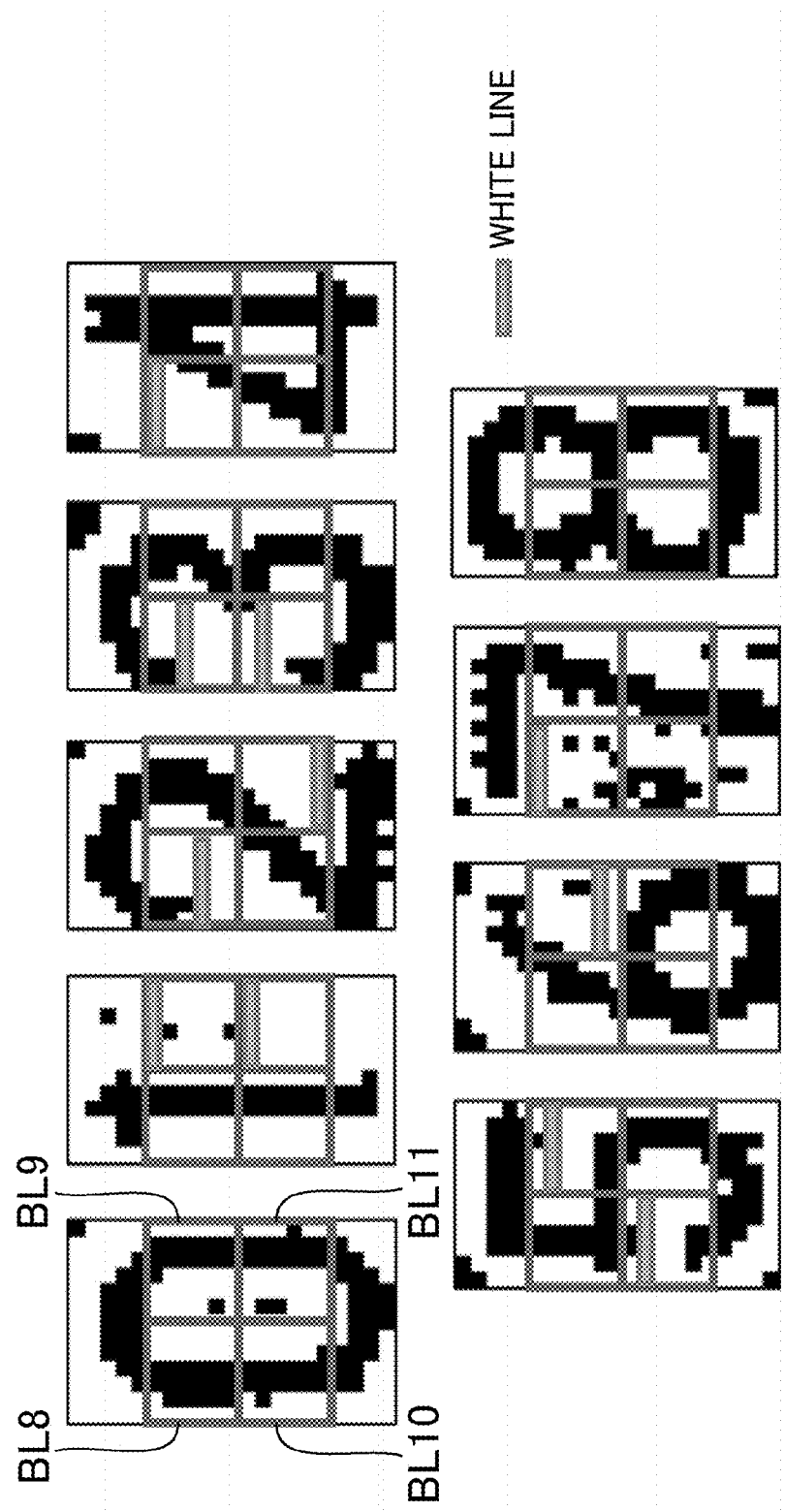
FIG. 6 includes views showing features of run lengths of images of numerals "0" to "8."

FIG. 6 shows features of the run lengths of images of numerals "0" to "8." In numeral "1," a white line of a length equal to or greater than a given length is present in the partial regions BL9 and BL11. In numeral "2," a white line of a length equal to or greater than the given length is present in the partial regions BL8 and BL11. In numeral "3," a white line of a length equal to or greater than the given length is present in the partial regions BL8 and BL10. In numeral "4," a white line of a length equal to or greater than the given length is present in the partial region BL8. In numeral "5," a white line of a length equal to or greater than the given length is present in the partial regions BL9 and BL10. In numeral "6," a white line of a length equal to or greater than the given length is present in the partial region BL9. In numeral "7," a white line of a length equal to or greater than the given length is present in the partial region BL8. In numerals "8" and "0," no white line of a length equal to or greater than the given length is present in any partial region. Thus, the patterns of presence/absence of a white line of a length equal to or greater than the given length in the partial regions BL8 to BL11 are different for different numerals. Note however that, although the pattern of presence/absence of a white line of a length equal to or greater than the given length is the same for numerals "0" and "8", numeral "0" is never used in the tens place in road speed signs, and conversely, any numeral other than numeral "0" is never used in the ones place. Numerals "0" and "8" can therefore be distinguished from each other by the position of the recognition target region in the scan window.

When the degree of inclination of a numeral due to inclination of the road speed sign, the degree of displacement due to displacement of the scan window, the degree of superimposition of noise, etc. are great, the patterns of presence/absence of a white line of a length equal to or greater than the given length in the partial regions BL8 to BL11 may differ from those described above. It is therefore difficult to recognize a numeral only with the continuity of pixels of a given color in the partial regions BL8 to BL11. For this reason, the determination module 18 determines the numeral comprehensively in conjunction with the feature quantities of the histograms of the partial regions BL1 to BL7.

Referring back to FIG. 1, the determination module 18 determines the numeral included in the recognition target region based on the computation results of the histogram computation modules 161 of the feature quantity extraction modules 16_1 to 16_7 and the determination results of the run length determination modules 162 of the feature quantity extraction modules 16_8 to 16_11. For example, the determination module 18 determines the numeral according to the following determination conditions. Note that, in the determination conditions, Hmax1 to Hmax5 refer to the maximum values of the histograms output from the histogram computation modules 161 of the feature quantity extraction modules 16_1 to 16_5, respectively, Hmin6 and Hmin7 refer to the minimum values of the histograms output from the histogram computation modules 161 of the feature quantity extraction modules 16_6 and 16_7, respectively, and RL1 to RL4 refer to the determination results output from the run length determination modules 162 of the feature quantity extraction modules 16_8 to 16_11, respectively. RL1 to RL4 are "1" when a white line of a length equal to or greater than a given length has been detected, and "0" when such a white line has not been detected, with "*" representing don't care.

<Determination of Numeral "0">
(RL1, RL2, RL3, RL4)=(0, 0, 0, 0)
Hmax1, Hmax2, Hmax3, and Hmax5 are 50% or more.
Hmax1−Hmin6 and Hmax2−Hmin6 are 30% or more.
|Hmax1−Hmax2| is less than 50%.
|Hmax3−Hmax5| is less than 30%.
Hmin6 and Hmin7 are 10% or more.

If the above conditions are satisfied, the determination module 18 determines that the numeral included in the recognition target region is "0."

<Determination of Numeral "1">
(RL1, RL2, RL3, RL4)=(0, *, 0, *)
Hmax1 is 70% or more.
Hmax3 is less than 70%.
Hmax4 and Hmax5 are less than 50%.
or
(RL1, RL2, RL3, RL4)=(0, *, 0, *)
Hmax1 is 70% or more.
Hmax3, Hmax4, and Hmax5 are less than 70%.
Hmax1−Hmin6 is 50% or more.
Hmin6 is 20% or less.

If the above conditions are satisfied, the determination module 18 determines that the numeral included in the recognition target region is "1."

<Determination of Numeral "2">
(RL1, RL2, RL3, RL4)=(1, 0, *, *)
Hmax1, Hmax2, and Hmax4 are less than 70%.
Hmax3 is 50% or more.
Hmax5 is 70% or more.
Hmax2−Hmin6 is less than 30%.

If the above conditions are satisfied, the determination module 18 determines that the numeral included in the recognition target region is "2."

<Determination of Numeral "3">
(RL1, RL2, RL3, RL4)=(1, 0, 1, 0)
Hmax1 is less than 70%.
Hmax2, Hmax3, and Hmax5 are 50% or more.

If the above conditions are satisfied, the determination module 18 determines that the numeral included in the recognition target region is "3."

<Determination of Numeral "4">
(RL1, RL2, RL3, RL4)=(*, 0, 0, 0)
Hmax1 is less than 50%.
Hmax2 and Hmax5 are 70% or more.
Hmax3 and Hmax4 are less than 70%.
or
(RL1, RL2, RL3, RL4)=(*, 0, 0, 0)
Hmax1, Hmax3, and Hmax4 are less than 70%.
Hmax2 and Hmax5 are 70% or more.
Hmax2−Hmin6 is 50% or more.
Hmax2−Hmax1 is 30% or more.
or
(RL1, RL2, RL3, RL4)=(*, 0, 0, 0)
Hmax2 and Hmax5 are 70% or more.
Hmax3 is less than 70%.
Hmax2−Hmin6 is 50% or more.
Hmax5−Hmin7 is 40% or more.

If the above conditions are satisfied, the determination module 18 determines that the numeral included in the recognition target region is "4."

<Determination of Numeral "5">
(RL1, RL2, RL3, RL4)=(0, 1, 1, 0)
Hmax1, Hmax2, Hmax3, Hmax4, and Hmax5 are 50% or more.

If the above conditions are satisfied, the determination module 18 determines that the numeral included in the recognition target region is "5."

<Determination of Numeral "6">
(RL1, RL2, RL3, RL4)=(0, 1, 0, 0)
Hmax1, Hmax4, and Hmax5 are 50% or more.
Hmax3 is less than 70%.

If the above conditions are satisfied, the determination module 18 determines that the numeral included in the recognition target region is "6."

<Determination of Numeral "7">
(RL1, RL2, RL3, RL4)=(1, 0, *, *)
Hmax1, Hmax2, Hmax4, and Hmax5 are less than 70%.
Hmax3 is 70% or more.
or
(RL1, RL2, RL3, RL4)=(1, 0, *, *)
Hmax3 is 70% or more.
Hmax3−Hmin7 is 50% or more.

If the above conditions are satisfied, the determination module 18 determines that the numeral included in the recognition target region is "7."

<Determination of Numeral "8">
(RL1, RL2, RL3, RL4)=(0, 0, 0, 0)
Hmax1, Hmax2, Hmax3, Hmax4, and Hmax5 are 70% or more.
or
(RL1, RL2, RL3, RL4)=(0, 0, 0, 0)
Hmax1, Hmax2, Hmax3, Hmax4, and Hmax5 are 50% or more.
Hmax1−Hmin6 is 20% or more.
Hmax2−Hmin6 is 20% or more.
|Hmax1−Hmax2| is less than 30%.
|Hmax3−Hmax5| is less than 30%.

If the above conditions are satisfied, the determination module 18 determines that the numeral included in the recognition target region is "8."

When any of the above conditions are not satisfied, the determination module 18 may determine that the binarized image as the recognition target is not an image of a road speed sign. To state more specifically, in the road speed signs, any numeral other than numeral "0" may not appear in the right-side recognition target region in the scan window (see FIG. 2). Therefore, the control module 14 may first scan the right-side recognition target region in the scan window, and the determination module 18 may determine whether or not the binarized image as the recognition target is an image of a road speed sign based on whether or not the symbol included in the recognition target region is "0." When the symbol included in the right-side recognition target region in the scan window is "0," then the control module 14 may scan the left-side recognition target region in the scan window, and the determination module 18 may recognize the numeral in the tens place of the speed.

As described above, according to this embodiment, a symbol included in a binarized image stored in the image memory 12 can be recognized at high speed with high precision using hardware.

Description has been omitted for the determination conditions for numeral "9." This is because numeral "9" is not used in the road speed signs in some countries, e.g., Japan, not because of inability to recognize numeral "9." Like the other numerals, it is easy to recognize numeral "9" based on the features of the histograms and run lengths of the image of numeral "9."

The speed is sometimes represented by a three-digit numeral in the road speed signs. In such cases, three recognition target regions may be set in the scan window to correspond to the three digit numerals. Moreover, in the road speed signs, it is assumed that the numeral in the hundreds place can't be a numeral other than "1." Therefore, the control module 14 may first scan the left-side recognition target region in the scan window, and the determination module 18 may determine whether or not the binarized image as the recognition target is an image of a road speed sign based on whether or not the symbol included in this recognition target region is "1." When the symbol included in the left-side recognition target region in the scan window is "1," then the control module 14 may scan the middle or right-side recognition target region in the scan window, and the determination module 18 may recognize the numeral in the tens or ones place of the speed.

Symbols other than numerals, such as alphabets, hiragana and katakana characters can also be recognized by a technique similar to that described above. In recognition of symbols other than numerals, however, the above-described partial regions BL1 to BL11 are not necessarily optimal as partial regions for determining histograms and run lengths. In this case, therefore, it is desirable to use partial regions in which features of the symbols are reflected.

Since the run length determination modules 162 of the feature quantity extraction modules 16_1 to 16_7 and the histogram calculation modules 161 of the feature quantity extraction modules 16_8 to 16_11 are not used in reality, these components may be omitted if the recognition is limited to numerals. This can reduce the circuit scale. Also, the feature quantity extraction modules 16_1 to 16_11 can share data and resources by optimization, and so, more circuit scale reduction can be achieved.

Conversely, as in this embodiment, by placing an appropriate number of feature quantity extraction modules 16 each having the histogram computation module 161 and the run length determination module 162 and controlling the input of pixel information into the histogram computation modules 161 and the run length determination modules 162 of the feature quantity extraction modules 16 by the control module 14, general versatility capable of responding to recognition of various symbols other than numerals can be provided although the circuit scale increases.

In a case where a plurality of partial regions overlap in a recognition target region, the feature quantity extraction modules 16 may be shared so that one feature quantity extraction module 16 can perform processing for a plurality of partial regions, and this can reduce the entire circuit scale.

However, since the circuit scale of one feature quantity extraction module 16 is very small, the influence of increase in circuit scale is considered restrictive even if a large number of feature quantity extraction modules 16 are placed. Therefore, the feature quantity extraction modules 16 may be shared on an occasion where the circuit scale raises a problem.

Second Embodiment

Figure 7:
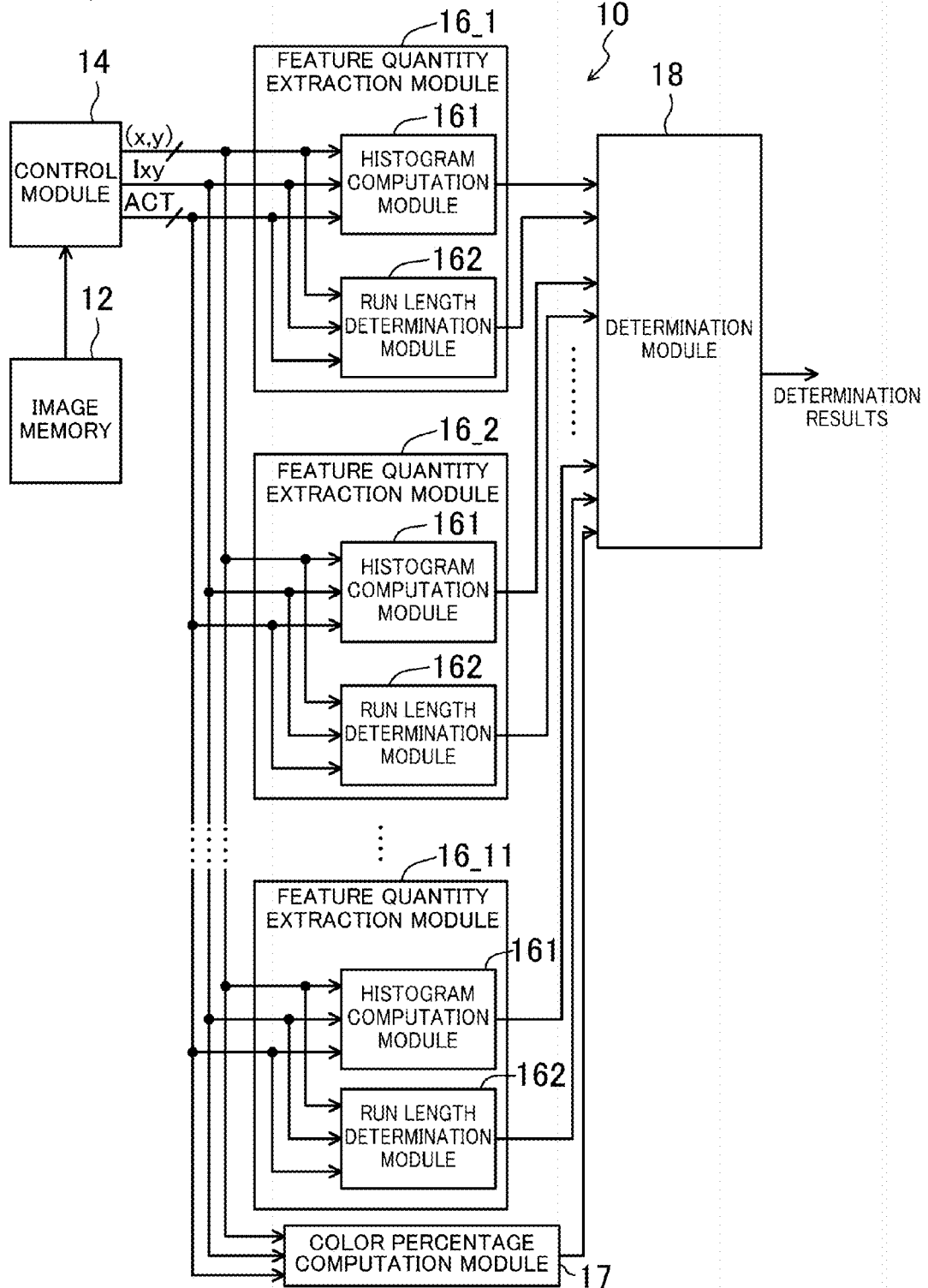
FIG. 7 is a block diagram of a main part of a symbol recognition device according to the second embodiment.

FIG. 7 shows a configuration of a main part of a symbol recognition device according to the second embodiment. The symbol recognition device 10 according to this embodiment includes a color percentage computation module 17 in addition to the components of the symbol recognition device 10 according to the first embodiment, and moreover uses the run length determination modules 162 of the feature quantity extraction modules 16_1 to 16_5 and 16_7 to improve the recognition precision of numerals. In this embodiment, description will be omitted on matters similar to those in the first embodiment, and emphasis will be placed on description of points different from the first embodiments.

The color percentage computation module 17, receiving an image of a recognition target region directly from the image memory 12 or indirectly via the control module 14, computes the percentage of pixels of a given color in the recognition target region. The given color is black for the normal road speed signs, and white for the electrically displayed road speed signs. For example, the percentage of pixels of the given color is 66% or less for numeral "0," 40% or less for numeral "1," 46% or less for numeral "2," 43% or less for numeral "3," 50% or less for numeral "4," 54% or less for numeral "5," 48% or less for numeral "6," 44% or less for numeral "7," and 61% or less for numeral "8."

The control module 14 outputs the control signal ACT to control the input of pixel information into the color percentage computation module 17. For example, the color percentage computation module 17 takes in the pixel values Ixy and the coordinate data (x, y) when the input control signal ACT is high, and does not take in the pixel values Ixy or the coordinate data (x, y) when the control signal ACT is low. In this way, with only one-time scanning of the binarized image stored in the image memory 12, images of arbitrary partial regions of the binarized image can be input into the feature quantity extraction modules 16_1 to 16_11 and the color percentage computation module 17. Then, the feature quantity extraction modules 16_1 to 16_11 and the color percentage computation module 17 perform given processing for the input images independently from each other and concurrently.

The determination module 18 determines the numeral included in the recognition target region, considering the computation results of the color percentage computation module 17 in addition to the determination conditions for the numerals described above. With this additional consideration of the computation results of the color percentage computation module 17, the recognition precision of the numerals improves. Also, when the determination conditions for the numerals and the computation results of the color percentage computation module 17 contradict each other, it can be determined that the symbol included in the recognition target region is not a numeral. It can further be determined that the binarized image as the recognition target is not an image of a road traffic sign.

Since "0" and "8" among the numerals have no significant feature in shape, a completely different image tends to be wrongly recognized as numeral "0" or "8." In this embodiment, therefore, the recognition precision of numerals "0" and "8" can be improved by taking special measures as follows.

Figure 8:
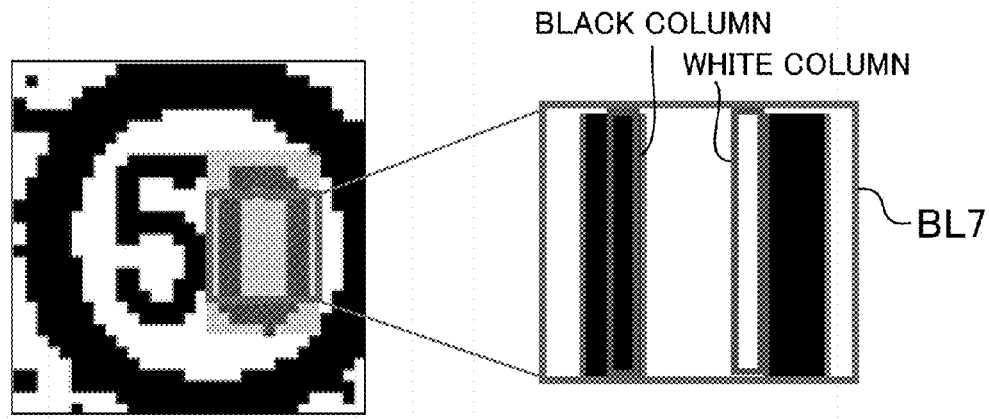
FIG. 8 includes views showing features of run lengths in a certain partial region of numeral "0."

FIG. 8 shows features of run lengths in a partial region of numeral "0." Attention may be focused on the partial region BL7 (see FIG. 3) when numeral "0" is included in the recognition target region. In this region, from the features of the font design of numeral "0," a number of black columns and white columns of a length equal to or greater than a given length are present. In consideration of this, the run length determination module 162 of the feature quantity extraction module 16_7, receiving the image of the partial region 16_7, determines whether or not given numbers or more of black columns and white columns of a length equal to or greater than a given length are present in the partial region BL7. The given length may be an arbitrary length such as 90% or 95% of the height of the partial region BL7, for example. The height of the partial region BL7 may be designated as the given length. In this case, the run length determination module 162 determines whether or not given numbers or more of all black columns and all white columns are present in the partial region BL7. The given numbers may just be an integer equal to or more than 1, and can be changed depending on the size of the scan window.

The determination module 18 can determine that the numeral included in the recognition target region is "0," considering the determination results of the run length determination module 162 of the feature quantity extraction module 16_7 in addition to the determination conditions for numeral "0" described above. In this way, the recognition precision of numeral "0" improves.

Figure 9:
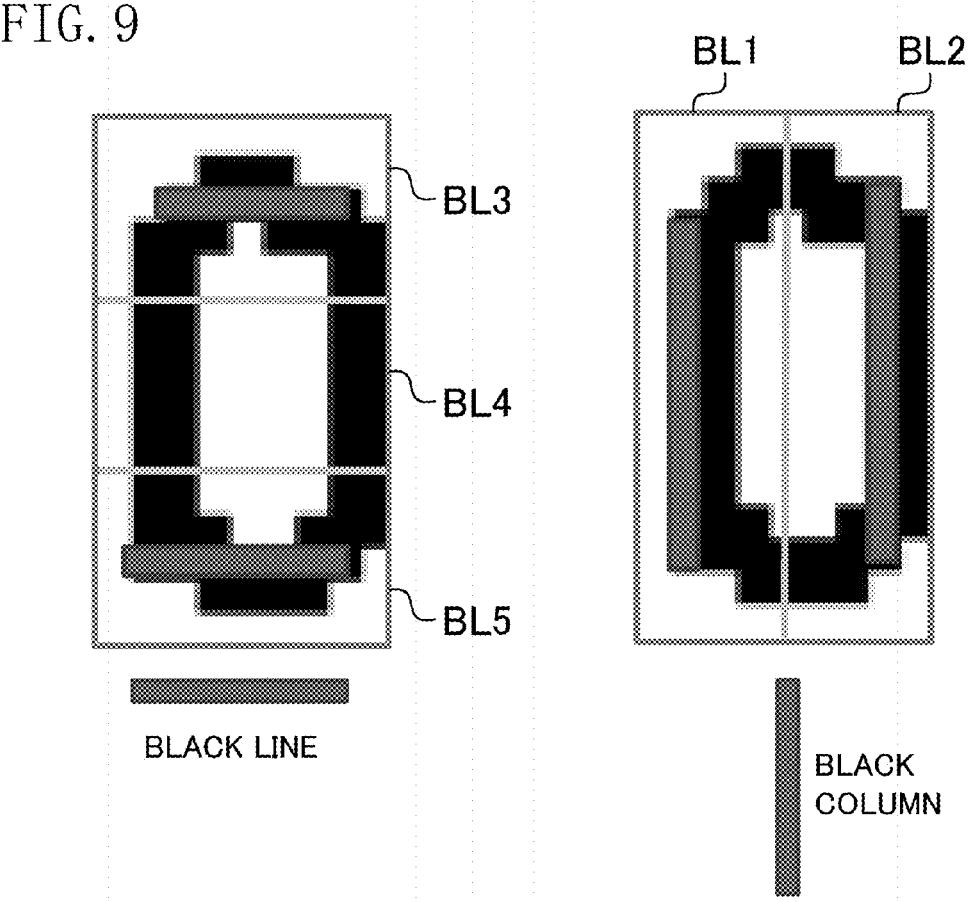
FIG. 9 includes views showing features of run lengths in some other partial regions of numeral "0."

FIG. 9 shows features of run lengths in some other partial regions of numeral "0." Attention may be focused on the partial regions BL1 to BL3 and BL5 (see FIG. 3) when numeral "0" is included in the recognition target region. From the features of the font design of numeral "0," a column of pixels of a given color having a length equal to or greater than a given length is present in the partial regions BL1 and BL2, and a line of pixels of the given color having a length equal to or greater than a given length is present in the partial regions BL3 and BL5. In consideration of this, the run length determination modules 162 of the feature quantity extraction modules 16_1 and 16_2, receiving the images of the partial regions BL1 and BL2, determine whether or not a column of pixels of a given color having a length equal to or greater than a given length is present in the partial regions BL1 and BL2, respectively, and the run length determination modules 162 of the feature quantity extraction modules 16_3 and 16_5, receiving the images of the partial regions BL3 and BL5, determine whether or not a line of pixels of the given color having a length equal to or greater than a given length is present in the partial regions BL3 and BL5, respectively. The given length is a half of the height of the partial region for the partial regions BL1 and BL2, and a half of the width of the partial region for the partial regions BL3 and BL5, for example.

The determination module 18 can determine that the numeral included in the recognition target region is "0," further considering the determination results of the run length determination modules 162 of the feature quantity extraction modules 16_1 to 16_3 and 16_5. In this way, the recognition precision of numeral "0" further improves.

Figure 10:
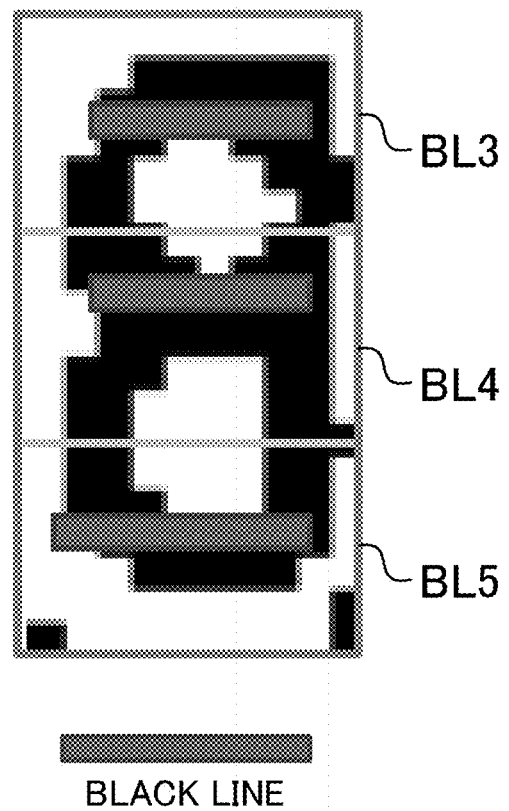
FIG. 10 is a view showing features of run lengths in some partial regions of numeral "8."

FIG. 10 shows features of run lengths in some partial regions of numeral "8." Attention may be focused on the partial regions BL3 to BL5 (see FIG. 3) when numeral "8" is included in the recognition target region. From the features of the font design of numeral "8," a line of pixels of a given color having a length equal to or greater than a given length is present in the partial regions BL3 to BL5. In consideration of this, the run length determination modules 162 of the feature quantity extraction modules 16_3 to 16_5, receiving the images of the partial regions BL3 to BL5, determine whether or not a line of pixels of a given color having a length equal to or greater than a given length is present in the partial regions BL3 to BL5, respectively. The given length is a half of the width of the partial regions BL3 to BL5, for example.

The determination module 18 can determine that the numeral included in the recognition target region is "8," considering the determination results of the run length determination modules 162 of the feature quantity extraction modules 16_3 to 16_5 in addition to the determination conditions for numeral "8" described above. In this way, the recognition precision of numeral "8" improves. Note that the determination results of the run length determination modules 162 of the feature quantity extraction modules 16_3 and 16_5 can be commonly used for the determination processing for numerals "0" and "8" by the determination module 18.

As described above, according to this embodiment, the recognition precision of numerals in road speed signs can be improved.

Third Embodiment

Figure 11:
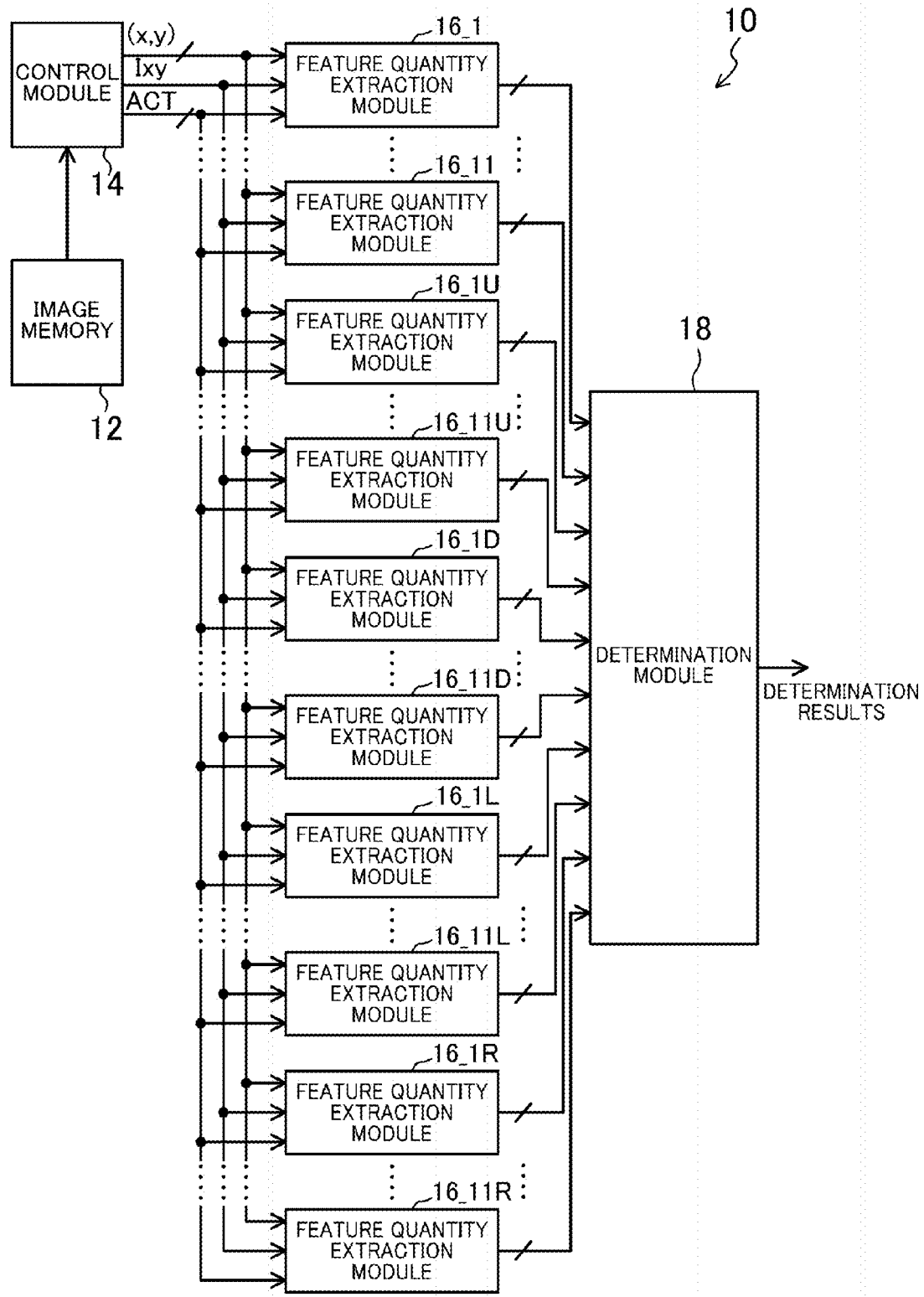
FIG. 11 is a block diagram of a main part of a symbol recognition device according to the third embodiment.

FIG. 11 shows a configuration of a main part of a symbol recognition device according to the third embodiment. The symbol recognition device 10 according to this embodiment includes feature quantity extraction modules 16_1U to 16_11U, 16_1D to 16_11D, 16_1L to 16_11L, and 16_1R to 16_11R in addition to the components of the symbol recognition device 10 according to the first embodiment. In this embodiment, description will be omitted on matters similar to those in the first embodiment, and emphasis will be placed on description of points different from the first embodiments.

When a recognition target such as a traffic sign is not captured properly in the scan window, the symbol to be recognized may be off from the recognition target region failing in proper recognition of the symbol. In consideration of this, the symbol recognition device 10 according to this embodiment performs recognition processing, not only for the reference recognition target regions positioned roughly in the center of the scan window, but also for recognition target regions slightly displaced therefrom upward, downward, leftward, and rightward, concurrently.

Figure 12:
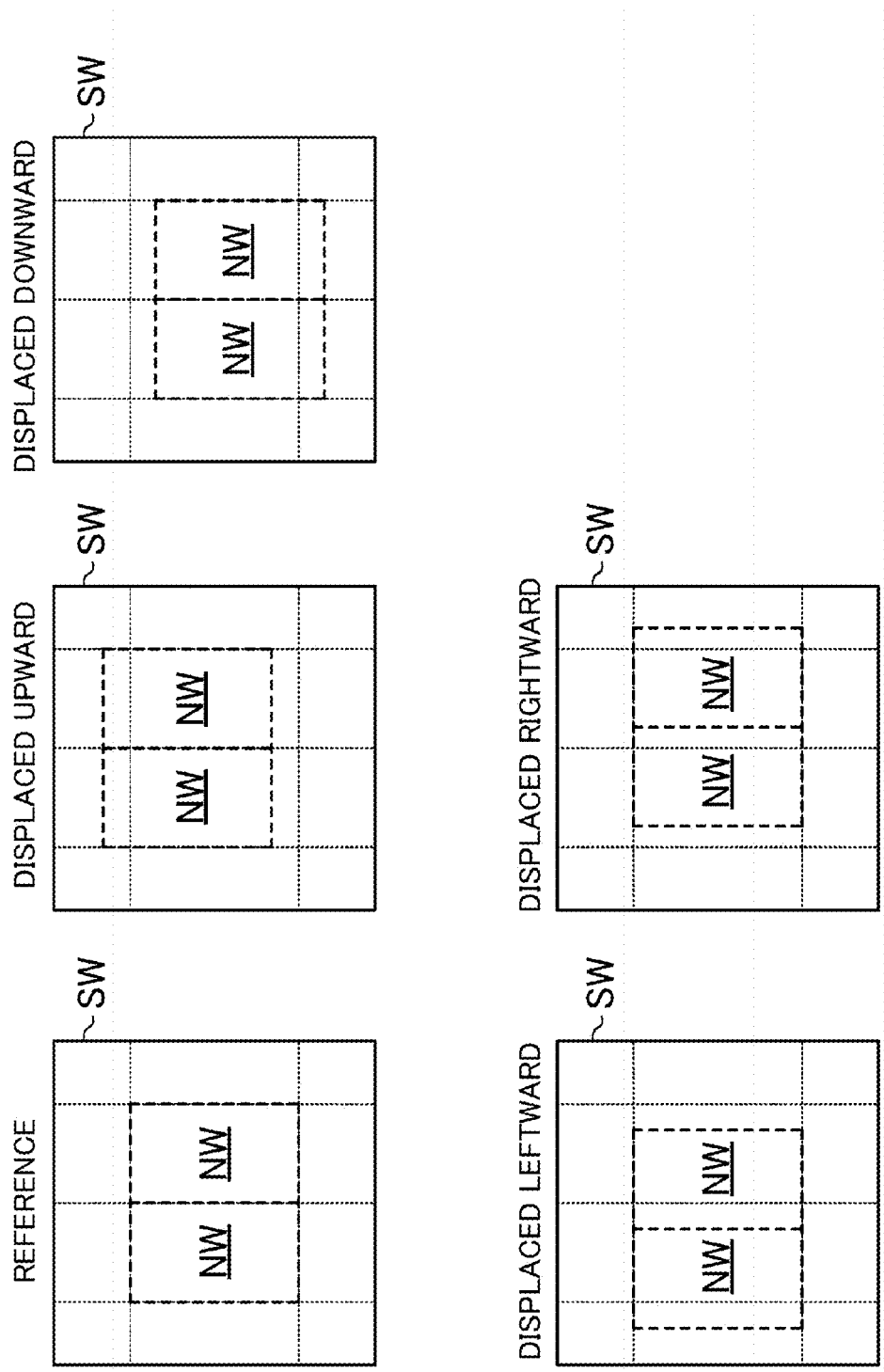
FIG. 12 includes views showing an example of a reference recognition target region and examples of recognition target regions displaced upward, downward, leftward, and rightward.

FIG. 12 shows an example of the reference recognition target regions and examples of recognition target regions displaced therefrom upward, downward, leftward, and rightward. The images of the partial regions of the reference recognition target regions NW are input into the feature quantity extraction modules 16_1 to 16_11. The images of the partial regions of the upward-displaced recognition target regions NW are input into the feature quantity extraction modules 16_1U to 16_11U. The images of the partial regions of the downward-displaced recognition target regions NW are input into the feature quantity extraction modules 16_1D to 16_11D. The images of the partial regions of the leftward-displaced recognition target regions NW are input into the feature quantity extraction modules 16_1L to 16_11L. The images of the partial regions of the rightward-displaced recognition target regions NW are input into the feature quantity extraction modules 16_1R to 16_11R. The feature quantity extraction modules 16_1U to

16_11U, 16_1D to 16_11D, 16_1L to 16_11L, and 16_1R to 16_11R are components having the same configuration as the feature quantity extraction modules 16_1 to 16_11, with the exception that the images input are different from those input into the feature quantity extraction modules 16_1 to 16_11.

The displacement amount of the recognition target regions can be changed appropriately in accordance with the size of the scan window: e.g., the displacement amount may be one pixel when the size of one side of the scan window is 20 to 29 pixels, two pixels when it is 30 to 39 pixels, and three pixels when it is 40 to 50 pixels.

The control module 14 outputs the control signal ACT to control the input of the pixel information into the histogram computation modules 161 and the run length determination modules 162 of the feature quantity extraction modules 16_1 to 16_11, 16_1U to 16_11U, 16_1D to 16_11D, 16_1L to 16_11L, and 16_1R to 16_11R. For example, the histogram computation modules 161 and the run length determination modules 162 take in the pixel values Ixy and the coordinate data (x, y) when the input control signal ACT is high and do not take in the pixel values Ixy or the coordinate data (x, y) when the control signal ACT is low. In this way, with only one-time scanning of the binarized image stored in the image memory 12, images of arbitrary partial regions of the binarized image can be input into the histogram computation modules 161 and the run length determination modules 162. Then, the histogram computation modules 161 and the run length determination modules 162 perform given processing for the input images independently from each other and concurrently.

The determination module 18 determines the numeral included in each of the displacements of the recognition target regions based on the outputs of the feature quantity extraction modules 16_1 to 16_11, 16_1U to 16_11U, 16_1D to 16_11D, 16_1L to 16_11L, and 16_1R to 16_11R. Note that the determination module 18 can determine the recognition result of the symbol by a majority of the recognition results of the recognition target regions.

As described above, according to this embodiment, even if the recognition target fails to be correctly captured in the scan window, the symbol included in the binarized image can be correctly recognized.

For the symbol recognition device 10 according to the second embodiment, also, correct recognition of the symbol included in the binarized image is possible even if the recognition target fails to be correctly captured in the scan window by additionally providing a color percentage computation module 17 that receives images of upward-, downward-, leftward-, and rightward-displaced recognition target regions.

Fourth Embodiment

As shown in FIG. 2, for example, a road speed sign represented by a design of two-digit numeral surrounded by a circle frame is captured in the scan window SW in its entirety including the circle frame. The symbol recognition devices 10 according to the first to third embodiments perform image analysis regarding a roughly center portion of such a scan window SW as the recognition target regions and splitting the recognition target regions into some partial regions, thereby recognizing the symbol included in the scan window SW, i.e., in the binarized image. In the scan window SW, as shown in FIG. 2, the circle frame of the road speed sign is included in a region surrounding the recognition target regions. Image analysis can therefore be performed for such a surrounding region, also, to detect the circle frame, and, from the detection results, whether or not the scan window SW, i.e., the binarized image is an image of a road speed sign can be determined. In other words, the above-described symbol recognition devices 10 can be extended to construct traffic sign recognition devices.

Figure 13:
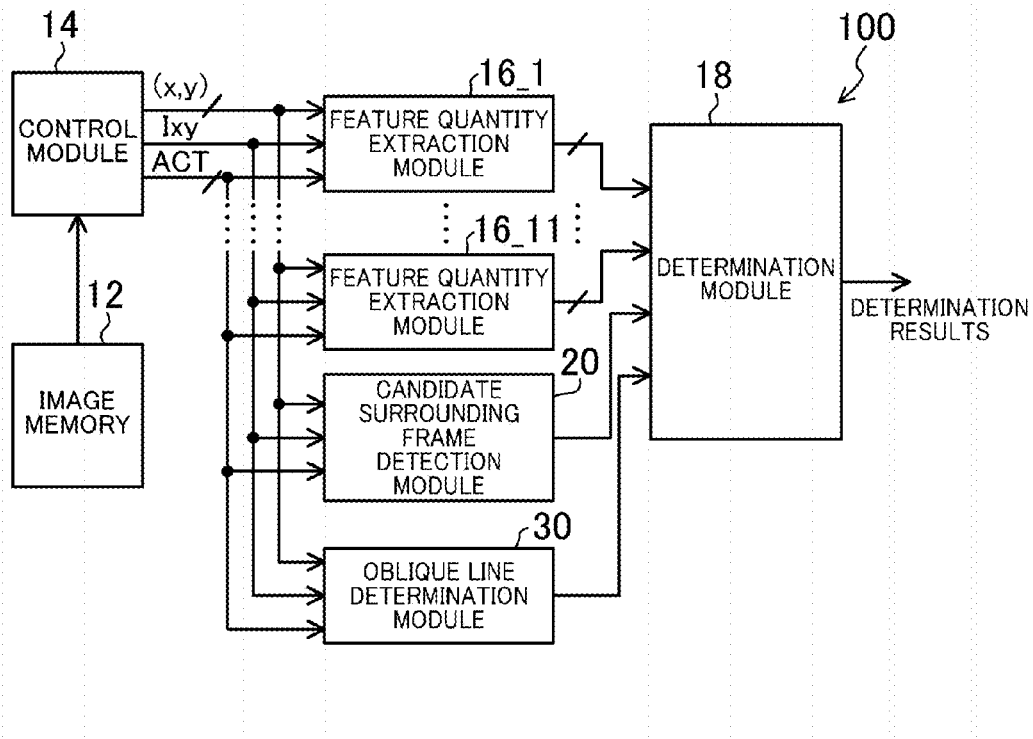
FIG. 13 is a block diagram of a main part of a traffic sign recognition device according to the fourth embodiment.

FIG. 13 shows a configuration of a main part of a traffic sign recognition device according to the fourth embodiment. The traffic sign recognition device 100 according to this embodiment includes a candidate surrounding frame detection module 20 and an oblique line determination module 30 in addition to the components of the symbol recognition device 10 according to the first embodiment. In this embodiment, description will be omitted on matters similar to those in the first embodiment, and emphasis will be placed on description of points different from the first embodiment.

The candidate surrounding frame detection module 20 detects a frame of a traffic sign (i.e., a candidate surrounding frame) in a binarized image stored in the image memory 12. Pixel information is input into the candidate surrounding frame detection module 20 directly from the image memory 12 or indirectly via the control module 14. A road speed sign, for example, has a circle frame around a two-digit numeral as shown in FIG. 2. To detect such a circle frame, the candidate surrounding frame detection module 20 detects whether or not a given number or more of lines, columns, or oblique lines of pixels of a given color having a length equal to or greater than a given length are present in some partial regions of the binarized image. From the determination results, the frame of the traffic sign can be detected. The given color is black for the normal traffic signs, and white for the electrically displayed traffic signs.

FIG. 14 shows examples of partial regions of a binarized image to be processed by the candidate surrounding frame detection module 20. The candidate surrounding frame detection module 20 determines whether or not a given number or more of lines, columns, or oblique lines of pixels of a given color having a length equal to or greater than a given length are present in each of eight partial regions BL21 to BL28 in the shapes of vertically-long, horizontally-long, and oblique rectangles. More specifically, the candidate surrounding frame detection module 20 determines whether or not a given number or more of columns of pixels of a given color having a length equal to or greater than a given length are present in the partial regions BL21 and BL23, determines whether or not a given number or more of lines of pixels of the given color having a length equal to or greater than a given length are present in the partial regions BL22 and BL24, determines whether or not a given number or more of top-left to bottom-right 45-degree oblique lines of pixels of the given color having a length equal to or greater than a given length are present in the partial regions BL25 and BL27, and determines whether or not a given number or more of bottom-left to top-right 45-degree oblique lines of pixels of the given color having a length equal to or greater than a given length are present in the partial regions BL26 and BL28. The given length may be an arbitrary length such as 90% or 95% of the longitudinal length of each of the partial regions. The given number of lines, columns, or oblique lines may be an arbitrary number such as one. Once determining that the given number or more of lines, columns, or oblique lines of pixels of the given color having a length equal to or greater than the given length are present in all of the partial regions BL21 to BL28, the candidate surrounding frame detection module 20 determines that a circle frame used in a road speed sign, etc. is present in the binarized image.

The frame of a traffic sign to be detected by the candidate surrounding frame detection module 20 is not necessarily a circle frame. By appropriately changing the partial regions to be processed by the candidate surrounding frame detection module 20, the candidate surrounding frame detection module 20 can be made to respond to detection of rhombic frames used for danger warning signs, inverted triangular frames used for slow signs and stop signs, etc.

Traffic signs include, other than road speed signs, signs representing prohibition such as no U-turn and no passing (hereinafter, referred to as prohibition signs), and these prohibition signs commonly include an oblique line representing prohibition. Referring back to FIG. 13, the oblique line determination module 30 determines whether or not such an oblique line is present in the binarized image stored in the image memory 12. More specifically, the oblique line determination module 30 determines whether or not an oblique line of pixels of a given color having a length equal to or greater than a given length is present in an oblique partial region of the binarized image stored in the image memory 12. The pixel information is input into the oblique line determination module 30 directly from the image memory 12 or indirectly via the control module 14. The given color is black for the normal traffic signs, and white for the electrically displayed traffic signs.

FIG. 15 shows an example of a partial region of a binarized image to be processed by the oblique line determination module 30 and some examples of signs representing prohibition. The oblique line determination module 30 determines whether or not an oblique line of pixels of a given color having a length equal to or greater than a given length is present in an oblique rectangular partial region BL29 in the scan window SW.

Referring back to FIG. 13, the control module 14 outputs the control signal ACT, to control the input of the pixel information into the candidate surrounding frame detection module 20 and the oblique line determination module 30. For example, the candidate surrounding frame detection module 20 and the oblique line determination module 30 take in the pixel values Ixy and the coordinate data (x, y) when the input control signal ACT is high and do not take in the pixel values Ixy or the coordinate data (x, y) when the control signal ACT is low. In this way, with only one-time scanning of the binarized image stored in the image memory 12, images of arbitrary partial regions of the binarized image can be input into the feature quantity extraction modules 16_1 to 16_11, the candidate surrounding frame detection module 20, and the oblique line determination module 30. Then, the feature quantity extraction modules 16_1 to 16_11, the candidate surrounding frame detection module 20, and the oblique line determination module 30 perform given processing for the input images independently from each other and concurrently.

The determination module 18, receiving the outputs of the feature quantity extraction modules 16_1 to 16_11, the candidate surrounding frame detection module 20, and the oblique line determination module 30, determines whether or not the binarized image stored in the image memory 12 is a traffic sign, determines whether or not the image is a prohibition sign if it is a traffic sign, determines what kind of prohibition sign it is if it is a prohibition sign, and recognizes the limit speed if it is a speed sign, not a prohibition sign. First, the determination module 18 determines, based on the detection results of the candidate surrounding frame detection module 20, that the binarized image as the recognition target is not an image of a traffic sign if no frame for a traffic sign is included in the binarized image. When a frame for a traffic sign has been detected by the candidate surrounding frame detection module 20, the determination module 18 determines, based on the determination results of the oblique line determination module 30, that the binarized image as the recognition target is an image of a prohibition sign if an oblique line representing prohibition is included in the binarized image. Further, when a circle frame of a road speed sign has been detected by the candidate surrounding frame detection module 20 and absence of an oblique line representing prohibition in the binarized image has been determined by the oblique line determination module 30, the determination module 18 recognizes the symbol included in the binarized image as a numeral representing a limit speed.

When having determined that the binarized image as the recognition target is an image of a prohibition sign, the determination module 18 can further determine the kind of prohibition sign, also, based on the outputs of the feature quantity extraction modules 16_1 to 16_11, i.e., histograms and run lengths in the partial regions of the recognition target region.

For determination of the kind of prohibition sign, it is sometimes recommended to use histograms and run lengths of images of a recognition target region and partial regions suitable for this determination. In such cases, therefore, feature quantity extraction modules that receive pixel information of partial regions for the determination of the kind of prohibition sign may be provided separately, so that the determination module 18 may determine the kind of prohibition sign based on the outputs of such feature quantity extraction modules.

As described above, according to this embodiment, with only one-time scanning of the binarized image stored in the image memory 12 without the necessity of repeatedly reading the binarized image from the image memory 12, determination of a traffic sign, determination of a prohibition sign, recognition of the kind of prohibition sign, and recognition of the limit speed can be performed. Therefore, the traffic sign recognition device 100 according this embodiment is suitable for installation in hardware such as a field programmable gate array (FPGA). Also, by installing the traffic sign recognition device 100 according this embodiment in a FPGA, it is possible to realize a low-cost automotive embedded system that can perform real-time recognition processing of traffic signs while the automobile is moving.

As for the symbol recognition devices 10 according to the second and third embodiments, also, a traffic sign recognition device similar to that described above can be constructed by additionally providing the candidate surrounding frame detection module 20 and the oblique line determination module 30.

Various embodiments have been described above as example techniques of the present disclosure, in which the attached drawings and detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A symbol recognition device, comprising:
an image memory that stores a binarized image as a recognition target;
a plurality of histogram computation modules each of which receives an image of each partial region of a recognition target region in the binarized image and computes a frequency distribution of pixels of a given color in each line or column in the partial region;
a plurality of run length determination modules each of which receives an image of each partial region of the recognition target region and determines whether or not a line or column of pixels of the given color having a length equal to or greater than a given length is present in the partial region;
a control module that feeds pixel information of the partial regions, read by scanning the binarized image stored in the image memory, into the plurality of histogram computation modules and the plurality of run length determination modules; and
a determination module that determines a symbol included in the binarized image based on computation results of the plurality of histogram computation modules and determination results of the plurality of run length determination modules,
wherein
the plurality of histogram computation modules include first and second histogram computation modules that receive images of partial regions obtained by vertically splitting the recognition target region into two, respectively, third, fourth, and fifth histogram computation modules that receive images of partial regions obtained by horizontally splitting the recognition target region into three, respectively, a sixth histogram computation module that receives an image of a partial region horizontally in the center of the recognition target region, and a seventh histogram computation module that receives an image of a partial region vertically in the center of the recognition target region,
the plurality of run length determination modules include first, second, third, and fourth run length determination modules that receive images of partial regions obtained by vertically and horizontally splitting a partial region vertically in the center of the recognition target region into four, respectively, and
the determination module determines a symbol included in the recognition target region based on maximum values of histograms computed by the first to fifth histogram computation modules, minimum values of histograms computed by the sixth and seventh histogram computation modules, and determination results of the first to fourth run length determination modules.

2. The symbol recognition device of claim 1, wherein the plurality of run length determination modules include a fifth run length determination module that receives an image of a partial region vertically in the center of the recognition target region and determines whether or not given numbers or more of black columns and white columns having a length equal to or greater than a given length are present in the partial region, and
the determination module determines whether or not the symbol included in the recognition target region is numeral "0," additionally considering determination results of the fifth run length determination module.

3. The symbol recognition device of claim 2, wherein the plurality of run length determination modules include sixth and seventh run length determination modules that receive images of partial regions obtained by vertically splitting the recognition target region into two, respectively, and eighth and ninth run length determination modules that receive images of top and bottom partial regions obtained by horizontally splitting the recognition target region into three, respectively, and
the determination module determines whether or not the symbol included in the recognition target region is numeral "0," additionally considering determination results of the sixth to ninth run length determination modules.

4. The symbol recognition device of claim 3, wherein the plurality of run length determination modules include a tenth run length determination module that receives an image of a middle partial region obtained by horizontally splitting the recognition target region into three, and
the determination module determines whether or not the symbol included in the recognition target region is numeral "8," additionally considering determination results of the eighth to tenth run length determination modules.

5. The symbol recognition device of claim 2, wherein the plurality of run length determination modules include sixth, seventh, and eighth run length determination modules that receive images of partial regions obtained by horizontally splitting the recognition target region into three, respectively, and
the determination module determines whether or not the symbol included in the recognition target region is numeral "8," additionally considering determination results of the sixth to eighth run length determination modules.

6. The symbol recognition device of claim 1, wherein the plurality of run length determination modules include sixth and seventh run length determination modules that receive images of partial regions obtained by vertically splitting the recognition target region into two, respectively, and eighth and ninth run length determination modules that receive images of top and bottom partial regions obtained by horizontally splitting the recognition target region into three, respectively, and
the determination module determines whether or not the symbol included in the recognition target region is numeral "0," additionally considering determination results of the sixth to ninth run length determination modules.

7. The symbol recognition device of claim 6, wherein the plurality of run length determination modules include a tenth run length determination module that receives an image of a middle partial region obtained by horizontally splitting the recognition target region into three, and
the determination module determines whether or not the symbol included in the recognition target region is numeral "8," additionally considering determination results of the eighth to tenth run length determination modules.

8. The symbol recognition device of claim 1, wherein the plurality of run length determination modules include sixth, seventh, and eighth run length determination modules that receive images of partial regions obtained by horizontally splitting the recognition target region into three, respectively, and the determination module determines whether or not the symbol included in the recognition target region is numeral "8," additionally considering determination results of the sixth to eighth run length determination modules.

* * * * *

UNITED STATES PATENT AND TRADEMARK OFFICE
CERTIFICATE OF CORRECTION

PATENT NO. : 9,959,473 B2  
APPLICATION NO. : 15/084457  
DATED : May 1, 2018  
INVENTOR(S) : Koide et al.

Page 1 of 1

It is certified that error appears in the above-identified patent and that said Letters Patent is hereby corrected as shown below:

On the Title Page

In Column 1, in item (60), delete "Provisional application no. PCT/JP2014/004918, filed on Sep. 25, 2014." and insert -- Continuation of application PCT/JP2014/004918, filed on Sep. 25, 2014. --, therefor.

Signed and Sealed this  
Tenth Day of July, 2018

Andrei Iancu  
*Director of the United States Patent and Trademark Office*